United States Patent
Bareis

(10) Patent No.: US 8,418,576 B2
(45) Date of Patent: Apr. 16, 2013

(54) DEVICE FOR PRESSING ON A GEAR RACK

(75) Inventor: Helmut Bareis, Eschach (DE)

(73) Assignee: ZF Lenksysteme GmbH, Schwaebisch Gmuend (DE)

( * ) Notice: Subject to any disclaimer, the term of this patent is extended or adjusted under 35 U.S.C. 154(b) by 0 days.

(21) Appl. No.: 13/134,705

(22) Filed: Jun. 15, 2011

(65) Prior Publication Data

US 2011/0297472 A1 Dec. 8, 2011

Related U.S. Application Data

(63) Continuation of application No. PCT/EP2009/067145, filed on Dec. 15, 2009.

(30) Foreign Application Priority Data

Dec. 17, 2008 (DE) .......................... 10 2008 054 782

(51) Int. Cl.
*F16H 55/28* (2006.01)

(52) U.S. Cl.
USPC .............................................. 74/422; 74/409

(58) Field of Classification Search ................. 74/89.11, 74/89.12, 89.17, 388 PS, 409, 422
See application file for complete search history.

(56) References Cited

U.S. PATENT DOCUMENTS

| | | | |
|---|---|---|---|
| 4,724,717 A | 2/1988 | Chikuma | |
| 4,788,878 A | 12/1988 | Morita et al. | |
| 7,487,984 B1 * | 2/2009 | Lemont et al. | 280/93.514 |
| 7,908,748 B2 | 3/2011 | Nishikubo | |
| 2003/0074996 A1 | 4/2003 | Camp | |
| 2006/0185460 A1 | 8/2006 | Shiino et al. | |
| 2008/0034911 A1 | 2/2008 | Bieber et al. | |
| 2009/0120226 A1 | 5/2009 | Nishikubo | |
| 2010/0122595 A1 * | 5/2010 | Sung et al. | 74/409 |

FOREIGN PATENT DOCUMENTS

| | | |
|---|---|---|
| DE | 38 35 947 | 4/1990 |
| DE | 201 14 759 | 1/2002 |
| DE | 600 03 611 | 4/2004 |
| DE | 600 06 339 | 8/2004 |
| DE | 10 2004 053 462 | 5/2006 |
| DE | 10 2006 008 269 | 8/2006 |
| DE | 10 2006 043 578 | 3/2008 |
| DE | 11 2006 003 012 | 10/2008 |
| EP | 1 136 342 | 9/2001 |

* cited by examiner

*Primary Examiner* — David M Fenstermacher
*Assistant Examiner* — Terence Boes
(74) *Attorney, Agent, or Firm* — Jordan and Hamburg LLP

(57) ABSTRACT

A device for pressing a steering rack onto a pinion engaged with the steering rack, in particular for a steering system of a motor vehicle, comprises a pressure piece which can be loaded in the direction of the steering rack and is displaceably guided in a housing and an adjustment unit for compensating for play occurring in the steering system. A spring washer is disposed between the adjustment unit and the pressure piece, wherein the adjustment unit comprises a projection and the pressure piece comprises a recess, or the pressure piece comprises a projection and the adjustment unit comprises a recess, in the region of the spring washer.

14 Claims, 4 Drawing Sheets

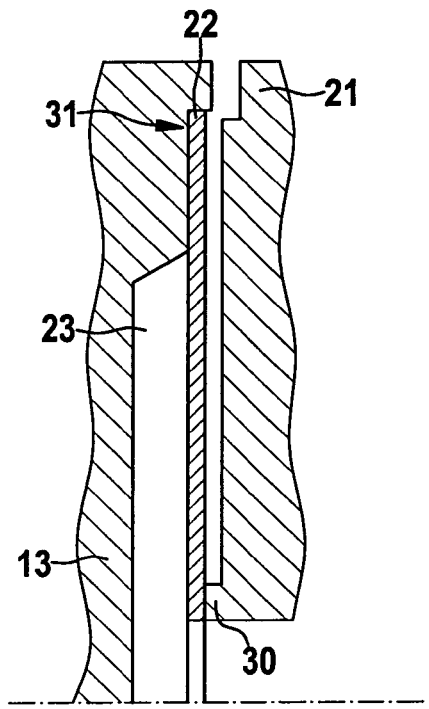
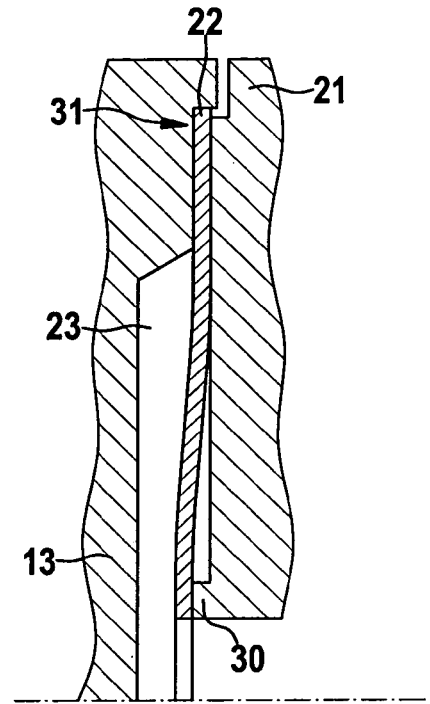
Fig. 3a  Fig. 3b
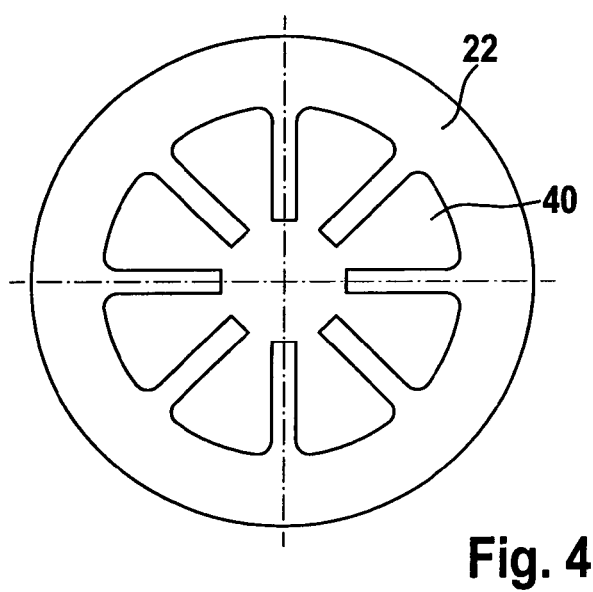
Fig. 4

DEVICE FOR PRESSING ON A GEAR RACK

This is a Continuation of PCT/EP2009/067145 filed Dec. 15, 2009.

BACKGROUND OF THE INVENTION

The invention relates to a device for pressing a steering rack onto a pinion engaged with the steering rack, in particular for a steering system of a motor vehicle, comprising a pressure piece, which can be loaded in the direction of the steering rack and is displaceably guided in a housing, and an adjustment unit for compensating for play occurring in the steering system.

In the devices of the type in question that are known from the prior art, the play of the pressure piece must be adjusted using an adjusting screw. Adjusting the play frequently poses problems, because the adjusting screw must be secured to prevent accidental loosening. For this purpose, when finally set, the adjusting screw is frequently press-fit stemmed. Given the press-fit stemming, the play of the pressure piece may undesirably change due to the action of forces during operation.

It is the object of the invention to improve the device of the type described above to the effect that, in the future, complex adjustment of the play can be eliminated.

SUMMARY OF THE INVENTION

The invention achieves the object at hand by a device of the type mentioned above, in which, according to the invention, a spring washer is disposed between the adjustment unit and the pressure piece, wherein the adjustment unit comprises a projection and the pressure piece comprises a recess, or the pressure piece comprises a projection and the adjustment unit comprises a recess, in the region of the spring washer. The projection of the adjustment unit or of the pressure piece thus creates play, which is at least large enough, for example, to compensate for unevenness in the interlocking between a pinion and a steering rack, out-of-roundness in the pinion, parallelism defects in terms of the interlocking of the steering rack and the back thereof, and other tolerance-induced deviations. The recess in the pressure piece or in the adjustment unit provides the spring washer with the spring travel required to compensate for the above-mentioned play. As a result, the necessary play is assured solely by the design configuration of the projection and recess. The problematic adjustment of the screw can thus be eliminated.

In the inner region, the spring washer can be provided with at least one recess. The spring washer is therefore thicker than one without recesses. The thicker spring washer, however, is easier to manufacture than the thinner spring washer in terms of levelness and tolerances.

So as to dispose the spring washer on the pressure piece in a precisely defined position, the pressure piece can comprise a further recess for accommodating the spring washer.

To secure the spring washer in the further recess, the additional recess can comprise an edge that can be press-fit stemmed.

Pressing surfaces between the pressure piece and spring washer, and between the adjustment unit and spring washer, respectively, can be as large as possible. In this way, only low surface pressures are generated on the pressing surfaces, and thus the adjustment unit can be manufactured from synthetic material in the region of the spring washer.

In a further embodiment, the adjustment unit can have a preferably peripheral recess in the edge region on the side thereof opposite of the pressure piece. The recess is advantageously located opposite of the edge that can be press-fit stemmed. In this way, it forms a clearance, which is intended to prevent the adjustment unit from striking against the pressure piece when the spring washer is deflected and the pressure piece is moved toward the adjustment unit.

Advantageously, however, the projection can be slightly larger than the play that is to be compensated for. An axial force of the adjustment unit causes a minimal deflection of the spring washer, whereby the play available for compensating for the aforementioned deviations can be reduced. It is therefore useful to dimension the projection larger around this minimum deflection of the spring washer.

In a refinement of the invention, the adjustment unit can comprise two disks that can be rotated relative to one another and are seated against one another on contact surfaces, wherein the contact surfaces comprise at least two oblique surface segments. The two disks can be rotated relative to one another by a torsion spring. The adjustment unit can thus automatically compensate for wear-induced play that develops over the course of the operation, or settling of the steering rack, the pressure piece, or an interposed foil. Given the low surface pressure between the disks and the spring washer, the disks can be manufactured from synthetic material.

In this refinement of the invention, the spring washer is advantageously disposed between the disk adjoining the pressure piece and the pressure piece.

So as to form a clearance, which is intended to prevent the adjustment unit from striking against the pressure piece when the spring washer is deflected and the pressure piece is moved toward the adjustment unit, the disk adjoining the pressure piece can comprise a preferably peripheral recess in the edge region on the side thereof that is opposite of the pressure piece.

In practice, the device according to the invention exhibits particularly good results when the spring washer has a thickness between 0.5 millimeters and 0.7 millimeters.

Because the spring washer is a component that is produced in large quantities, it is particularly cost-effective to produce when it is a stamped part.

The invention further relates to a motor vehicle, which according to the invention comprises a device according to any one of claims 1 to 12.

An exemplary embodiment of the device according to the invention will be described hereinafter in more detail based on the enclosed drawings.

BRIEF DESCRIPTION OF THE DRAWINGS

FIGS. 3a and 3b are detailed views of FIG. 2, in the region of a spring washer in the deflected state and the non-deflected state;

FIG. 4 is a top view of the spring washer;

DESCRIPTION OF THE PREFERRED EMBODIMENTS

Figure 1:
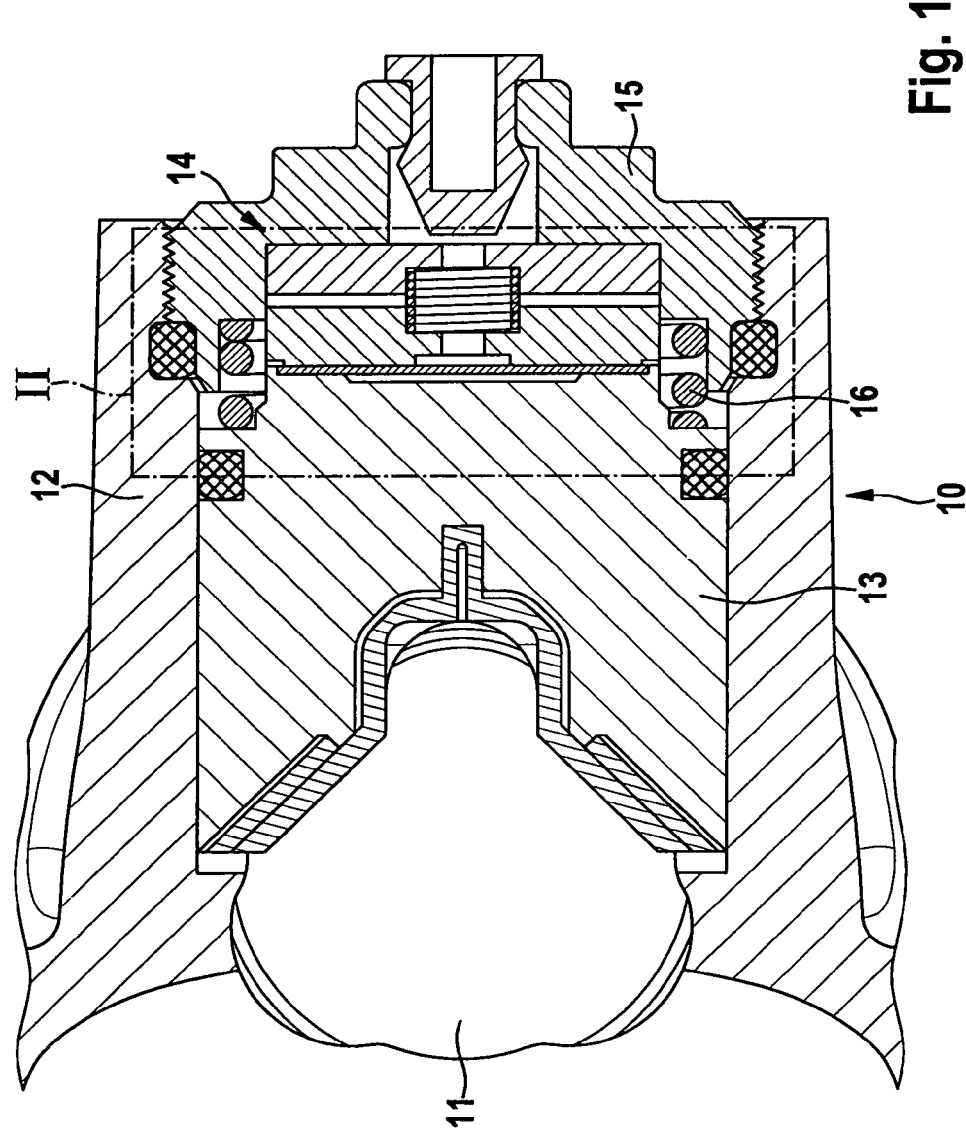
FIG. 1 is a sectional view of a pressure price and an adjustment unit.

FIG. 1 shows a device 10 for pressing a steering rack 11 onto a pinion, which is not shown in detail here. A pressure piece 13 is displaceably guided in a housing 12. An adjustment unit 14 is disposed adjacent to the pressure piece 13.

A pressure spring 16, which presses the pressure piece 13 against the steering rack 11, is disposed between an adjusting screw 15 and the pressure piece 13.

A spring washer 22 is disposed between the adjustment unit 14, which comprises two disks 20 and 21, and the pressure piece 13. A recess 23 is provided in the pressure piece 13 in the region of the spring washer 22 (see FIG. 2).

The disk 21 comprises a projection 30, which is seated against the spring washer 22 (see FIGS. 3a and 3b). The height of the projection 30 corresponds to at least play corresponding, for example, to unevenness in the interlocking between the pinion and the steering rack 11, out-of-roundness in the pinion, parallelism defects in terms of the interlocking of the steering rack 11 and the back thereof, and other tolerance-induced deviations.

The spring washer 22 is seated against the pressure piece 13 on an annular pressing surface 31. The pressing surface 31 is as large as possible, so that the surface pressure between the spring washer 22 and the pressure piece 13 on the one hand, and between the spring washer 22 and the disk 21 on the other hand, is as low as possible. When the surface pressure is minimal, the disk 21 can be manufactured from synthetic material without problems.

FIG. 3a shows the spring washer 22 in the non-deflected state. In the non-deflected state, only the projection 30 of the disk 21 is seated against the spring washer 22.

In the deflected state (see FIG. 3b), both the projection 30 and a larger outer region of the disk 21 are seated against the spring washer 22. Notably the region of the disk 21 that is opposite of the pressing surface 31 undergoes particularly high surface pressure.

If the aforementioned deviations must be compensated for, the pressure piece 13 is pressed against the adjustment unit 14 or against the disk 21 (see FIGS. 2 and 3b), wherein the spring washer 22 is also pressed against the projection 30, so that the spring washer 22 is deflected into the recess 23 (see FIG. 3b).

The spring washer 22 comprises a recess 40 (see FIG. 4), which is why the spring washer 22 is thicker than a spring washer without a recess 40. The thicker spring washer 22, however, is easier to produce than the spring washer without recess a 40 in terms of levelness and tolerances.

Figure 2:
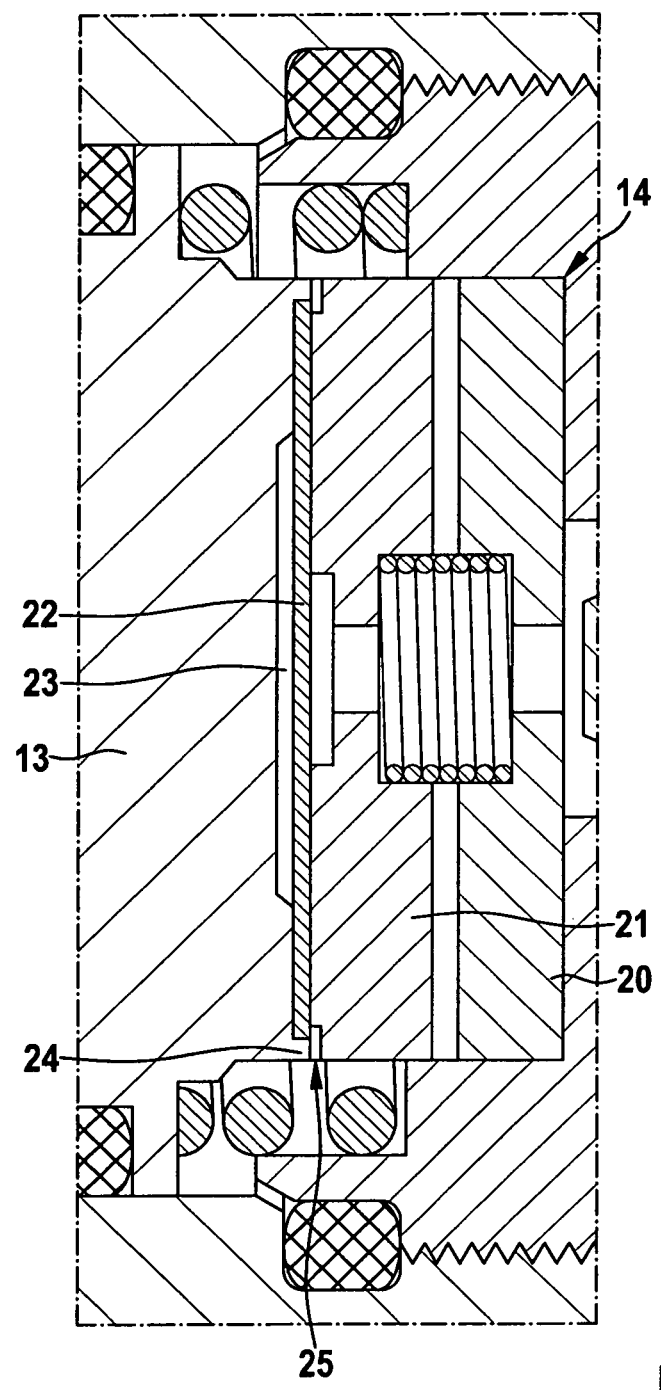
FIG. 2 is a detailed view of FIG. 1.

The spring washer 22 is placed in a recess having an edge 24 (see FIG. 2). The edge 24 can be press-fit stemmed so as to fix the spring washer 22. Opposite the edge 24, a recess 25 is provided (see FIG. 2), which prevents the disk 21 from striking the pressure piece 13 when the spring washer 22 is deflected.

Figure 5:
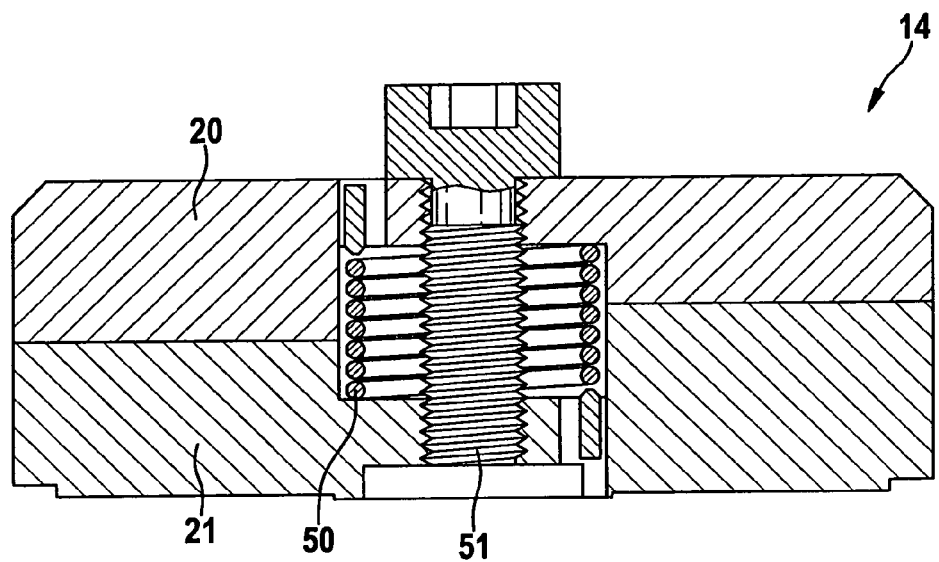
FIG. 5 is a sectional view of an adjustment unit.
Figure 6:
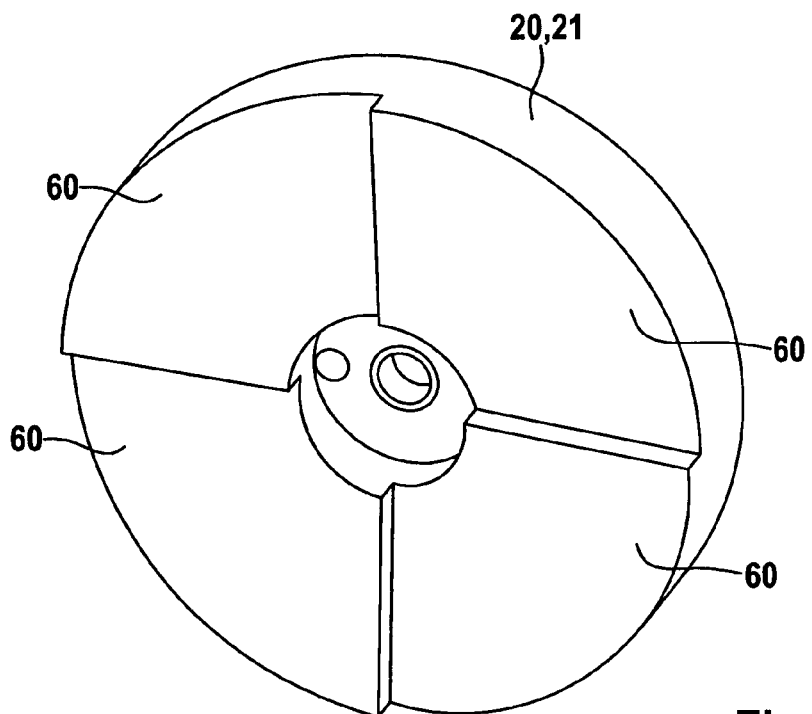
FIG. 6 is a perspective view of a disk of the adjustment unit in FIG. 5.

FIG. 5 shows the adjustment unit 14, which comprises the two disks 20 and 21. The disks 20 and 21 are provided with contact surfaces having oblique surface segments 60 (see FIG. 6). The surface segments 20 and 21 can be rotated relative to one another by a torsion spring 50, whereby the overall thickness of the two disks 20 and 21 increases. The obliqueness of the surface segments is relatively slight. This prevents the disks 20 and 21 from rotating opposite to the direction of rotation of the torsion spring 50.

The adjustment unit 14 can be preassembled as an assembly unit. For this purpose, the two disks 20 and 21 are fastened to one another by means of a screw 51 and rotation is prevented. In the assembled state, the two disks 20 and 21 have a minimal overall thickness.

After assembly of the pressure spring 16 (see FIG. 1), the adjusting screw 15 is tightened using a very specific torque, so that the play caused by the projection 30 is bridged. The adjusting screw 15 is then loosened again by a defined angle, wherein the angle should correspond to the play caused by the projection 30. However, if the adjusting screw loosened by a larger angle, so that the adjustment unit 14 travels further in the axial direction than the play caused by the projection 30, this can be compensated for by the adjustment unit 14 after the screw 51 is removed. The adjusting screw 15 can be secured, for example, by gluing. However, other possibilities for securing the adjusting screw 15 are also conceivable, which are known to persons skilled in the art.

The invention claimed is:

1. A device for pressing a steering rack onto a pinion engaged with the steering rack, comprising a steering rack engaged with a pinion, a pressure piece which can be loaded in the direction of the steering rack and is displaceably guided in a housing, an adjustment unit compensating for play occurring in the steering system, the adjustment unit comprising two disks that can be rotated relative to one another and are seated against contact surfaces, the contact surfaces comprising at least two oblique surface segments, a spring washer disposed between the adjustment unit and the pressure piece, wherein a projection is situated at the adjustment unit, and a recess occurs opposite the projection at the pressure piece, and wherein a portion of the spring washer is situated between the projection and the pressure piece a height of the projection defining a play of the pressure piece.

2. A device according to claim 1, wherein the spring washer is provided with at least one recess in an inner region.

3. A device according to claim 1, wherein the adjustment unit comprises a recess in an edge region on a side thereof opposite the pressure piece.

4. A device according to claim 1, wherein a height of the projection is larger than a clearance between the spring washer and a portion of the pressure piece.

5. A device according to claim 1, wherein the spring washer is disposed between the disk adjoining the pressure piece and the pressure piece.

6. A device according to claim 1, wherein the disk adjoining the pressure piece comprises a recess in an edge region on a side thereof that is opposite the pressure piece.

7. A device according to claim 1, wherein the spring washer has a thickness between 0.5 millimeters and 0.7 millimeters.

8. A device according to claim 1, wherein the spring washer is a stamped part.

9. A device according to claim 1, wherein the pressure piece comprises a further recess for accommodating the spring washer.

10. A device according to claim 9, wherein the further recess comprises an edge that can be press-fit stemmed.

11. A device for pressing a steering rack onto a pinion engaged with the steering rack, comprising a steering rack engaged with a pinion, a pressure piece which can be loaded in the direction of the steering rack and is displaceably guided in a housing, an adjustment unit compensating for play occurring in the steering system, the adjustment unit comprising two disks that can be rotated relative to one another and are seated against contact surfaces, the contact surfaces comprising at least two oblique surface segments, a spring washer disposed between the adjustment unit and the pressure piece, wherein the adjustment unit comprises a projection and the pressure piece comprises a recess, the size of the projection defining a play of the pressure piece; and wherein the pressure piece comprises a further recess for accommodating the spring washer.

12. A device according to claim 11, wherein the further recess comprises an edge that can be press-fit stemmed.

13. A device for a steering system of a motor vehicle comprising means for pressing a steering rack onto a pinion engaged with the steering rack, a pressure piece, which can be loaded in the direction of the steering rack and is displaceably guided in a housing, an adjustment unit compensating for play occurring in the steering system, the adjustment unit comprising two disks that can be rotated relative to one another and are seated against contact surfaces, the contact surfaces comprising at least two oblique surface segments, a spring washer is disposed between the adjustment unit and the pressure piece, wherein a projection is situated at the adjustment unit, and a recess occurs opposite the projection at the pressure piece, and wherein a portion of the spring washer is situated between the projection and the pressure piece, a height of the projection defining a play of the pressure piece.

14. A device for a steering system of a motor vehicle comprising means for pressing a steering rack onto a pinion engaged with the steering rack, a pressure piece, which can be loaded in the direction of the steering rack and is displaceably guided in a housing, an adjustment unit compensating for play occurring in the steering system, the adjustment unit comprising two disks that can be rotated relative to one another and are seated against contact surfaces, the contact surfaces comprising at least two oblique surface segments, a spring washer is disposed between the adjustment unit and the pressure piece, wherein a projection is situated at the adjustment unit, and a recess occurs opposite the projection at the pressure piece, and wherein a portion of the spring washer is situated between the projection and the pressure piece.

* * * * *